United States Patent
Pierce et al.

(10) Patent No.: US 11,599,605 B1
(45) Date of Patent: Mar. 7, 2023

(54) SYSTEM AND METHOD FOR DYNAMIC DATA INJECTION

(71) Applicant: Hidden Pixels, LLC, Valencia, CA (US)

(72) Inventors: Jeff Pierce, Valencia, CA (US); John Naulin, Valencia, CA (US)

(73) Assignee: Hidden Pixels, LLC, Valencia, CA (US)

( * ) Notice: Subject to any disclaimer, the term of this patent is extended or adjusted under 35 U.S.C. 154(b) by 0 days.

(21) Appl. No.: 17/521,960

(22) Filed: Nov. 9, 2021

(51) Int. Cl.
*G06F 21/16* (2013.01)

(52) U.S. Cl.
CPC ...... *G06F 21/16* (2013.01); *G06F 2221/0737* (2013.01)

(58) Field of Classification Search
CPC .......................... G06F 21/16; G06F 2221/0737
See application file for complete search history.

(56) References Cited

U.S. PATENT DOCUMENTS

| | | | | |
|---|---|---|---|---|
| 6,208,745 B1 * | 3/2001 | Florencio | ............... | H04N 19/00 382/250 |
| 6,285,774 B1 * | 9/2001 | Schumann | ............. | H04N 5/913 375/E7.026 |
| 6,674,861 B1 * | 1/2004 | Xu | ........................ | G10L 19/018 380/278 |
| 6,807,634 B1 * | 10/2004 | Braudaway | ........ | H04N 1/32352 380/54 |
| 7,131,007 B1 * | 10/2006 | Johnston | ............... | G10L 19/018 704/E19.004 |
| 7,146,503 B1 * | 12/2006 | Johnston | ............... | G10L 19/022 704/E19.004 |
| 7,197,163 B2 * | 3/2007 | Wu | ......................... | G06T 1/005 382/250 |
| 7,444,000 B2 | 10/2008 | Rhoads | | |
| 7,620,253 B2 | 11/2009 | Miller | | |
| 8,150,096 B2 | 4/2012 | Alattar | | |
| 8,243,790 B2 * | 8/2012 | Leontaris | ............. | H04N 19/142 375/E7.243 |
| 8,806,215 B2 | 8/2014 | Chen | | |

(Continued)

OTHER PUBLICATIONS

Balasamy, K; Suganyadevi, S., A fuzzy based ROI selection for encryption and watermarking in medical image using DWT and SVD, Multimedia Tools and Applications; Dordrecht vol. 80, Iss. 5, (Feb. 2021): 7167-7186.*

(Continued)

*Primary Examiner* — David Garcia Cervetti
(74) *Attorney, Agent, or Firm* — Caldwell Intellectual Property Law

(57) ABSTRACT

In an aspect, a system for dynamic data injection is presented. A system includes a computing device. A computing device is configured to receive at least a digital media file. A digital media file includes at least a segment comprising a plurality of display quanta. A computing device is configured to select a portion of at least a segment of at least a digital media file as a function of a randomization engine. A computing device is configured to encode identifying data in a selected portion of at least a segment. Encoding includes modifying at least a display quanta of a plurality of display quanta of a selected portion of at least a segment. A computing device is configured to display at least a segment to a user.

20 Claims, 10 Drawing Sheets

(56) References Cited

U.S. PATENT DOCUMENTS

| | | | |
|---|---|---|---|
| 9,058,645 B1* | 6/2015 | Corley | H04N 21/8358 |
| 9,262,794 B2 | 2/2016 | Zhao | |
| 9,383,895 B1* | 7/2016 | Vinayak | G06F 3/04883 |
| 10,262,356 B2* | 4/2019 | Davis | G06F 16/532 |
| 10,284,885 B1* | 5/2019 | Borras | H04L 63/0428 |
| 10,332,191 B1* | 6/2019 | Eckel | G06Q 20/38215 |
| 10,360,735 B1* | 7/2019 | Reeder | G06K 9/6278 |
| 10,432,991 B2 | 10/2019 | Chen | |
| 10,740,903 B2* | 8/2020 | Jain | G06V 10/44 |
| 11,212,595 B1* | 12/2021 | Ramakrishnan | H04N 21/23106 |
| 2002/0019946 A1* | 2/2002 | Iwamura | G06F 21/10 709/224 |
| 2002/0071593 A1* | 6/2002 | Muratani | G06T 1/0064 704/E19.004 |
| 2003/0068043 A1* | 4/2003 | Tam | G10L 19/018 704/E19.004 |
| 2003/0103645 A1* | 6/2003 | Levy | H04N 21/44008 707/E17.112 |
| 2003/0138127 A1* | 7/2003 | Miller | B42D 25/333 375/E7.076 |
| 2004/0120404 A1* | 6/2004 | Sugahara | H04N 19/13 704/E19.004 |
| 2004/0125125 A1 | 7/2004 | Levy | |
| 2004/0143742 A1* | 7/2004 | Muratani | G06T 1/005 713/176 |
| 2005/0058318 A1 | 3/2005 | Rhoads | |
| 2005/0175179 A1* | 8/2005 | Kesal | G11B 20/00173 704/E19.004 |
| 2005/0226461 A1* | 10/2005 | Goldberg | G06T 1/0021 340/5.8 |
| 2006/0212704 A1* | 9/2006 | Kirovski | H04L 9/32 704/E19.009 |
| 2006/0239500 A1 | 10/2006 | Meyer | |
| 2007/0038578 A1* | 2/2007 | Liu | G06F 21/10 705/62 |
| 2009/0158315 A1* | 6/2009 | Bendall | H04N 7/185 725/32 |
| 2009/0172404 A1* | 7/2009 | Kim | G06T 1/0071 382/199 |
| 2010/0202652 A1* | 8/2010 | Mihcak | H04N 21/8358 382/100 |
| 2011/0314511 A1* | 12/2011 | Hartung | H04H 20/31 375/259 |
| 2012/0011592 A1* | 1/2012 | Loytynoja | H04N 1/32149 726/26 |
| 2013/0236046 A1* | 9/2013 | Nallusamy | H04N 21/8352 382/100 |
| 2014/0023225 A1* | 1/2014 | Chalamala | G06T 1/0021 382/100 |
| 2014/0093121 A1* | 4/2014 | Anan | G06T 1/005 382/100 |
| 2015/0093017 A1* | 4/2015 | Hefeeda | G06F 16/7847 382/154 |
| 2016/0071229 A1* | 3/2016 | Beaubien | G06T 1/0028 382/100 |
| 2016/0094802 A1* | 3/2016 | Thomas | H04N 21/44016 386/260 |
| 2016/0301958 A1* | 10/2016 | Srinivasan | H04N 21/858 |
| 2016/0328398 A1* | 11/2016 | Adams | G06F 16/48 |
| 2017/0092268 A1* | 3/2017 | Kristjansson | G10L 15/16 |
| 2017/0201763 A1* | 7/2017 | Kumar | G09G 5/006 |
| 2017/0329943 A1* | 11/2017 | Choi | G06F 21/10 |
| 2018/0359324 A1* | 12/2018 | Harlamert, II | G06Q 30/0269 |
| 2019/0156819 A1* | 5/2019 | Shafran | G10L 15/02 |
| 2019/0313161 A1* | 10/2019 | Wilms | H04N 21/8456 |
| 2020/0114924 A1* | 4/2020 | Chen | G06V 40/20 |
| 2020/0177960 A1* | 6/2020 | Rakshit | H04N 21/858 |
| 2020/0372135 A1* | 11/2020 | Li | H04L 9/3239 |
| 2020/0372137 A1* | 11/2020 | Li | H04L 9/006 |
| 2020/0372138 A1* | 11/2020 | Li | H04L 9/3239 |
| 2020/0372835 A1* | 11/2020 | Li | H04L 9/3297 |
| 2021/0019856 A1* | 1/2021 | Kumar | H04N 1/32277 |
| 2022/0020383 A1* | 1/2022 | Zhang | G10L 19/018 |
| 2022/0207875 A1* | 6/2022 | Kopparapu | G06F 16/785 |
| 2022/0301094 A1* | 9/2022 | Filler | G06F 3/1243 |

OTHER PUBLICATIONS

Gaata et al., Digital Watermarking Method based on Fuzzy Image Segmentation Technique, 2011, IEEE.*

Coumou et al., A Fuzzy Logic Approach to Digital Image Watermarking, 2008, Researchgate.*

Agarwal et al., A novel gray-scale image watermarking using hybrid Fuzzy-BPN architecture, 2015, Egyptian Informatics Journal.*

Wei-Che Chen, Ming-Shi Wang, A fuzzy c-means clustering-based fragile watermarking scheme for image authentication, Elsevier, 2009.*

Jamali et al., Adaptive Blind Image Watermarking Using Fuzzy Inference System Based on Human Visual Perception, Cornell University, 2018.*

Shivani Khosla and Paramjeet Kaur, Secure Data Hiding Technique Using Video Steganography and Watermarking, Jun. 30, 2014.

* cited by examiner

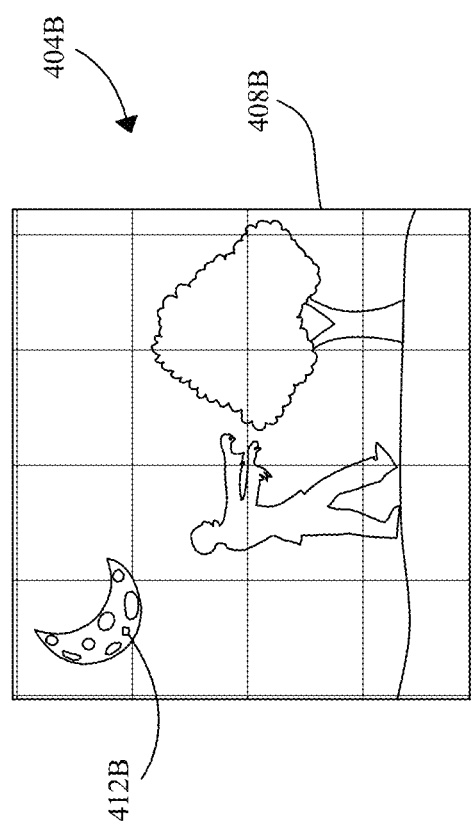
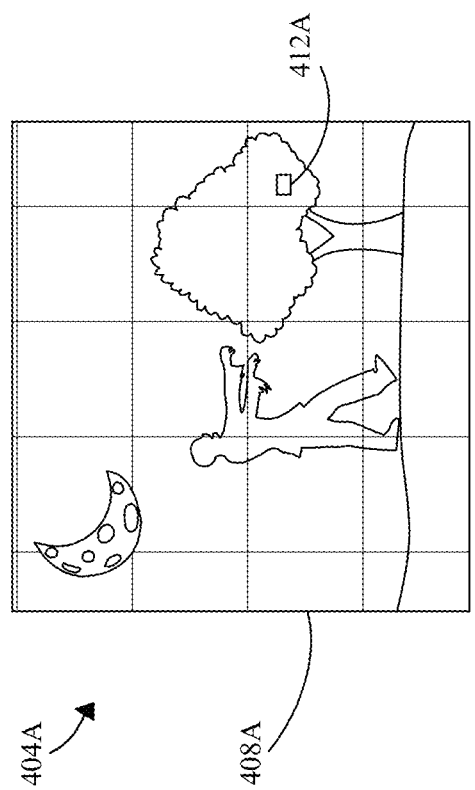
FIG. 4B
FIG. 4A

SYSTEM AND METHOD FOR DYNAMIC DATA INJECTION

FIELD OF THE INVENTION

The present invention generally relates to the field of data injection of digital media files. In particular, the present invention is directed to systems and methods for dynamic data injection.

BACKGROUND

Digital media files, such as videos, are prone to piracy. Modern methods of injecting data into video files, such as watermarking, commonly degrade the quality of the video and require a production of an entirely separate video file from the original. As such, modern systems and methods of injecting data into digital media files can be improved.

SUMMARY OF THE DISCLOSURE

In an aspect a system for dynamic data injection is presented. A system includes a computing device. A computing device is configured to receive at least a digital media file. A digital media file includes at least a segment comprising a plurality of display quanta. A computing device is configured to select a portion of at least a segment of at least a digital media file as a function of a randomization engine. A computing device is configured to encode identifying data in a selected portion of at least a segment. Encoding includes modifying at least a display quanta of a plurality of display quanta of a selected portion of at least a segment. A computing device is configured to display at least a segment to a user.

In another aspect a method of dynamic data injection using a computing device is presented. A method includes receiving at least a digital media file. At least a digital media file includes at least a segment. At least a segment includes a plurality of display quanta. A method includes selecting a portion of at least a segment of at least a digital media file as a function of a randomization engine. A method includes encoding identifying data in a selected portion. Encoding includes modifying at least a display quanta of a plurality of display quanta of a selected portion of at least a segment. A method includes displaying at least a segment to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A-B are illustrations of exemplary embodiments of data injection;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is a system for dynamic data injection. A system may include a computing device. A computing device may be configured to receive at least a digital media file. A digital media file may include at least a segment comprising a plurality of display quanta. A computing device may be configured to select a portion of at least a segment of at least a digital media file as a function of a randomization engine. A computing device may be configured to encode identifying data in a selected portion of at least a segment. Encoding may include modifying at least a display quanta of a plurality of display quanta of a selected portion of at least a segment. A computing device may be configured to display at least a segment to a user.

Described herein is a method of dynamic data injection using a computing device. A method may include receiving at least a digital media file. At least a digital media file may include at least a segment. At least a segment may include a plurality of display quanta. A method may include selecting a portion of at least a segment of at least a digital media file as a function of a randomization engine. A method may include encoding identifying data in a selected portion. Encoding may include modifying at least a display quanta of a plurality of display quanta of a selected portion of at least a segment. A method may include displaying at least a segment to a user.

Figure 1:
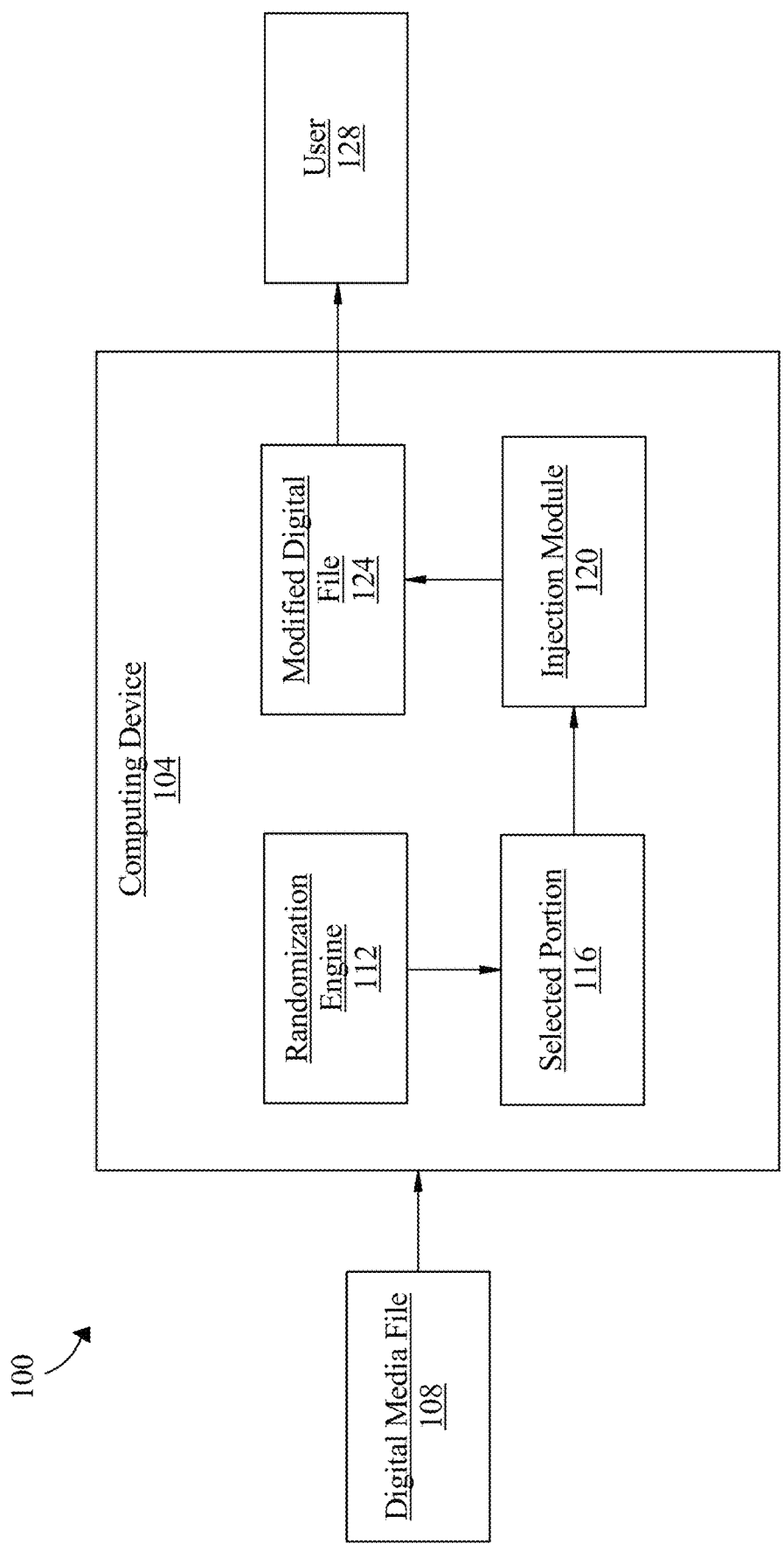
FIG. 1 is an exemplary embodiment of a system for dynamic data injection.

Referring now to FIG. 1, an exemplary embodiment of a system 100 for dynamic data injection is illustrated. System 100 includes computing device 104. Computing device 104 may include any computing device as described in this disclosure, including, without limitation, a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 includes digital media file 108. A "digital media file" as used in this disclosure is a collection of computer bits that represent pictorial and/or auditorial information. Digital media file 108 may include any communication media that operate with the use of any of various encoded machine-readable data formats. Digital media file 108 may include, but is not limited to, videos, photos, audio samples, songs, podcasts, video games, web pages, social media, digital data, software, electronic documents, and/or electronic books and the like. In some embodiments, digital media file 108 may include one or more formats. Digital media file 108 may include photographic formats such as, but not limited to, JPEG, GIF, TIFF, and/or BMP. Digital media file 108 may include video formats such as, but not limited to, MPEG-1, MPEG-2, MPEG-4, AVI, MOV, AVCHD, H.264, H.265, DivX, DivX HD, Xvid HD, MKV, RMVB, WMV9, TS/TP/M2t, and/or WMV. In some embodiments, digital media file 108 may include audio formats such as, but not limited to, AAC, MP3, WAV, WMA, DOLBY DIGITAL, DTS, and the like. Digital media file 108 may include DNX, DNXHR, ProRes, BRAW, and/or MXF. Digital media file 108 may be captured by an internet of things (JOT) connected device and may include a mix of data formats, including structured, semi-structured, and unstructured data. This may include for example analog signals, discrete sensor readings, health device metadata, and/or large files for images or video.

Still referring to FIG. 1, digital media file 108 may include a segment. A "segment" as used in this disclosure is any portion of an audio, image and/or video file. In some embodiments, a segment may include a frame. A "frame" as used in this disclosure is a subpart of a media file. In some embodiments, a frame may include video frames. Video frames may include still images which may form a video when viewed in sequential order. In some embodiments, video frames may be compressed. In some embodiments, computing device 104 may include a video compression process. A video compression process may reduce an amount of data needed to store a video. In some embodiments, a video compression process may include frame types. Frame types may include, but are not limited to, I-frames (intra-coded picture), P-frames (predicted picture), B-frames (bidirectional predicted picture), and the like. In some embodiments, I-frames may include a video frame that may be a complete image, such as, but not limited to, a JPG, BMP, or other image file. In some embodiments, P-frames may include a frame that may include changes in an image from a previous frame. As a non-limiting example, in a scene where a zombie walks across a stationary background, only the zombie's movements may be encoded. A video compression process may not need to encode the unchanging stationary background in the zombie scene which may save space. In some embodiments, B-frames may include data of a difference of a current frame, preceding frame, and following frame. A video compression process may use I-frames, P-frames, and/or B-frames to reduce an amount of data needed to store a video. In some embodiments, video frames may be arranged into a Group of Pictures (GOP). A "Group of Pictures" as used in this disclosure is an order in which intra-frames and inter-frames are arranged. In some embodiments, a GOP may include an order of frames that may be denoted by fame type. In a non-limiting example, a GOP may include an order of "IBBPBBP", where "I" is an I-frame, "B" is a B-frame, and "P" is a P-frame. In some embodiments, a GOP may be referred two by an N value and an M value. An "N value" as used in this disclosure is a length between two I-frames. An "M value" as used in this disclosure is a length between I-frames and P-frames and/or a length between two consecutive P-frames. As a non-limiting example, a GOP may be referred to as M=3 and N=12. These two values may correspond to a structure of "IBBPBBPBBPBBI".

Still referring to FIG. 1, digital media file 108 may include display quanta. "Display quanta" as used in this disclosure are units of information pertaining to a media source. A media source may include, but is not limited to, video, audio, photography, and the like. In some embodiments, display quanta may include, but are not limited to, pixels, audio samples, and the like. Display quanta may be encoded in various forms. In some embodiments, display quanta may be encoded by a video encoding process. A video encoding process may include, but is not limited to, discrete cosine transform (DCT), intra-frame coding, inter-frame coding, motion compensation, lossy compression, lossless compression, and the like. In some embodiments, display quanta may be encoded by an audio encoding process. An audio encoding process may include, but is not limited to, lossy compression, lossless compression, discrete cosine transform (DCT), linear predictive coding (LPC), modified discrete cosine transform (MDCT), and the like. In some embodiments, display quanta may include a bit rate. A "bit rate" as used in this disclosure is a number of bits conveyed and/or processes per unit of time. In some embodiments, a bit rate may be expressed in a unit of bit per second (bit/s). In some embodiments, a display quanta may include a bitstream. A bitstream may include a binary sequence of bits. In some embodiments, a bitstream may include a binary sequence of bits transmitted and/or received from one or more computing devices. In some embodiments, digital media file 108 may include additional data separate from display quanta. Additional data may include, but is not limited to, metadata, bitstream headers, motion vectors, filter parameters, and the like.

With continued reference to FIG. 1, computing device 104 may be configured to identify display quanta from additional data of digital media file 108. In some embodiments, digital media file 108 may include a video frame having one or more pixels. A "pixel" as used in this disclosure is a smallest addressable element in a raster image. A "raster image" as used in this disclosure is a bitmap image that represents a generally rectangular grid of pixels. In some embodiments, a pixel of digital media file 108 may include one or more components representing color intensities. In some embodiments, a pixel may include, but is not limited to, a red component, green component, blue component, cyan component, magenta component, yellow component, and/or black component. In some embodiments, a pixel may have different values of different color components that may correspond to a sample of an original image. In some embodiments, a pixel may include a number of bits, which may be referred to as bits per pixel (bpp). As a non-limiting example, a 1 bpp image may use 1 bit for each pixel which may mean each pixel may either be on or off. In some embodiments, each additional bit of a pixel may double a number of colors available. As a non-limiting example, a pixel may have 1 bpp which may correspond to 2 colors available (monochrome). In some embodiments, a pixel may have 2 bpp which may correspond to 4 colors available. A pixel may have 3 bpp, 4 bpp, 8 bpp, 16 bpp, 24 bpp, and the like. In some embodiments, a pixel may include a chroma value. A chroma value may include data of a colorfulness of an area which may be judged as a proportion of a brightness of a similarly illuminated area that may appear white. In some embodiments, a chroma value may include data pertaining to an object's color. In some embodiments, a pixel may include a luma value. A luma value may include data pertaining to a brightness of an image. In some embodiments, a luma value may include a weighted sum of gamma-compressed R'G'B' components of a video. In some embodiments, a video frame of digital media file 108 may include a chroma subsampled image. A chroma subsampled image may include an image that may implement less resolution for chroma information than for luma information, which may take advantage of the human visual system's lower acuity for color differences than for luminance.

Still referring to FIG. 1, in some embodiments, a video frame of digital file 108 may include a residual frame. A residual frame may be formed through a subtraction of a reference frame from a desired frame. A "reference frame" as used in this disclosure is a frame that is used to define future frames in a video. A reference frame and/or desired frame may include, but is not limited to, I-frames, P-frames, B-frames, and the like. In some embodiments, a video compression process may construct a frame from a residual frame, such as for motion estimation. In some embodiments, a video frame may include one or more motion vectors. "Motion vectors" as used in this disclosure are two-dimensional vectors that provide an offset from coordinates in one picture to coordinates in another picture. In some embodiments, motion vectors may be used for motion estimation between two or more video frames. In some embodiments, computing device 104 may include a motion estimation process. A "motion estimation process" as used in this disclosure is a model that may approximate a motion of a real video, such as rotation, translation, and zoom in all three dimensions. A motion estimation process may include, but is not limited to, Block-matching algorithms, phase correlation methods, pixel recursive algorithms, optical flow, corner detection, and the like.

Still referring to FIG. 1, in some embodiments, computing device 104 may receive digital media file 108 from one or more sources. In some embodiments, digital media file 108 may be received from an external computing device such as, but not limited to, a laptop, desktop, tablet, smartphone, and the like. In some embodiments, digital media file 108 may be received from a DVD, CD, or other storage device. In other embodiments, digital media file 108 may be received from a video streaming server. In some embodiments, computing device 104 may store digital media file 108 on a local storage system. As a non-limiting example, computing device 104 may receive digital media file 108 and store digital media file 108 in a hard drive. Computing device 104 may modify digital media file 108 and output a modified version of digital media file 108 on a computing device. In other embodiments, computing device 104 may receive digital media file 108 as a bitstream. Computing device 104 may modify digital media file 108 as a bitstream as the bitstream is received. As a non-limiting example, digital media file 108 may include a bitstream received from a server. Computing device 104 may modify each bitstream of a plurality of bitstreams of digital media file 108 as the plurality of bitstreams are transmitted to computing device 104. Computing device 104 may output modified bitstreams of digital media file 108 in a continuous manner.

Still referring to FIG. 1, in some embodiments, computing device 104 may include randomization engine 112. A "randomization engine" as used in this disclosure is a process that outputs a numerical value at random. Randomization engine 112 may include, but is not limited to, a pseudorandom numbers generator (PRNG), a true random number generator (TRNG), and the like. In some embodiments, randomization engine 112 may utilize a fuzzy matching process. A "fuzzy matching process" as used in this disclosure is a process that helps identify two elements that are not exactly the same. In some embodiments, randomization engine 112 may include a fuzzy set comparison. In some embodiments, a fuzzy set comparison may include a first fuzzy set. A first fuzzy set may be represented, without limitation, according to a first membership function representing a probability that an input falling on a first range of values is a member of the first fuzzy set, where the first membership function has values on a range of probabilities such as, without limitation, the interval [0,1], and an area beneath the first membership function may represent a set of values within the first fuzzy set. A first range of values may be defined on two or more dimensions, representing, for instance, a Cartesian product between a plurality of ranges, curves, axes, spaces, dimensions, or the like. A first membership function may include any suitable function mapping first range to a probability interval, including, without limitation, a triangular function defined by two linear elements such as line segments or planes that intersect at or below the top of the probability interval. As a non-limiting example, a triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 1, a first fuzzy set may represent any value or combination of values as described above, including predictive prevalence value, probabilistic outcome, any resource datum, any niche datum, and/or any combination of the above. A second fuzzy set, which may represent any value which may be represented by a first fuzzy set, may be defined by a second membership function on a second range; a second range may be identical and/or overlap with a first range and/or may be combined with a first range via Cartesian product or the like to generate a mapping permitting evaluation overlap of a first fuzzy set and a second fuzzy set. Where a first fuzzy set and a second fuzzy set have a region that overlaps, a first membership function and a second membership function may intersect at a point representing a probability, as defined on a probability interval, of a match between a first fuzzy set and a second fuzzy set. Alternatively or additionally, a single value of a first and/or a second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of a match between a first fuzzy set and a second fuzzy set, and/or single values therein with each other or with either set, which is sufficient for purposes of the matching process; for instance, a threshold may indicate a sufficient degree of overlap between probabilistic outcomes and/or predictive prevalence values for combination to occur as described above. There may be multiple thresholds; for instance, a second threshold may indicate a sufficient match for purposes of a pooling threshold as described in this disclosure. Each threshold may be established by one or more user inputs. Alternatively or additionally, each threshold may be tuned by a machine-learning and/or statistical process, for instance and without limitation, as described in further detail below.

Still referring to FIG. 1, in an embodiment, a degree of match between fuzzy sets may be used to rank one resource against another. For instance, if two predictive prevalence values have fuzzy sets matching a probabilistic outcome fuzzy set by having a degree of overlap exceeding a threshold, randomization engine 112 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple predictive prevalence values may be presented to a user in order of ranking.

Still referring to FIG. 1, in some embodiments a fuzzy matching process may include linguistic variables. "Linguistic variables" as used in this disclosure are values that are words and/or sentences in a natural or artificial language. As a non-limiting example, a linguistic variable may include brightness, which may have word values instead of numerical values, such as bright, not bright, very bright, quite bright, dark, not very dark, not very bright, and the like. In some embodiments, randomization engine 112 may use linguistic variables with fuzzy matching to determine elements of frame data of digital media file 108. In some embodiments, randomization engine 112 may use a fuzzy matching process that may input frame data and output categories associated with the frame data. As a non-limiting example, randomization engine 112 may use fuzzy matching to determine a frame or portion thereof of digital media file 108 may be "bright", "dark", "active", "still", "clear", "obscure", "background", "foreground", "focused", "unfocused", "high pixel density", "low pixel density", and the like.

Still referring to FIG. 1, in some embodiments, randomization engine 112 may include a frame classifier. A frame classifier may include a machine learning model that may be configured to classify one or more input into categories and/or subcategories of data. In some embodiments, a frame classifier may be trained on a plurality of training data. Training data may be received from user input, an exterior computing device, and the like. In some embodiments, training data may be received form iterations of a frame classifier. Training data may include frame data correlated to categories of frame data such as, but not limited to, night scene, day scene, action scene, still scene, dark scene, bright scene, focused scene, and the like. In some embodiments, randomization engine 112 may use a frame classifier to input frame data of digital media file 108 and output classifications of frame data such as, but not limited to, bright, dark, motion blur, high pixel density, low pixel density, clear, sharp, high white balance, low white balance, and the like. In some embodiments, randomization engine 112 may be configured to use a frame classifier to classify one or more subsections of a frame. As a non-limiting example, in a frame of a zombie walking through a forest, randomization engine 112 may use a frame classifier to classify frame data around the zombie as high motion blur, frame data around the trees in the background as dark and stationary, and frame data around a moon as high white balance and bright. Randomization engine 112 may use a frame classifier to select one or more portions of digital media file 108.

Still referring to FIG. 1, in some embodiments, randomization engine 112 may be configured to randomly generate selection portion 116. Selected portion 116 may include a portion of digital media file 108. In some embodiments, selected portion 116 may include an area of digital media file 108 selected by randomization engine 112. Selected portion 116 may include a region. A "region" as used in this disclosure is a subsection of an element. In some embodiments, a region may include, but is not limited to, a quantity of bits, blocks, slices, tiles, etc. In some embodiments, a region of selected portion 116 may include a number of pixels. In some embodiments, randomization engine 112 may select one or more candidate regions of digital media file 108. A candidate region may include a region that may ultimately be selected for data injection. In some embodiments, randomization engine 112 may compare two or more candidate regions.

Still referring to FIG. 1, randomization engine 112 may include an objective function. An "objective function" as used in this disclosure is a process of minimizing or maximizing one or more values based on a set of constraints. Randomization engine 112 may generate an objective function to optimize a selection of a region of digital media file 108. In some embodiments, an objective function of randomization engine 112 may include an optimization criterion. An optimization criterion may include any description of a desired value or range of values for one or more regions of a frame; desired value or range of values may include a maximal or minimal value, a range between maximal or minimal values, or an instruction to maximize or minimize an attribute. As a non-limiting example, an optimization criterion may specify that a selected region of a part should be the brightest; an optimization criterion may cap a size of a region, for instance specifying that a region must not have an area greater than a specified value. An optimization criterion may alternatively request that a region's area be greater than a certain value. An optimization criterion may specify one or more tolerances for motion blur of a region. An optimization criterion may specify one or more desired selection criterion for a selection process. In an embodiment, an optimization criterion may assign weights to different attributes or values associated with attributes; weights, as used herein, may be multipliers or other scalar numbers reflecting a relative importance of a particular attribute or value. As a non-limiting example, minimization of white balance may be multiplied by a first weight, while tolerance above a certain value may be multiplied by a second weight. Optimization criteria may be combined in weighted or unweighted combinations into a function reflecting an overall outcome desired by a user; function may be a selection process to be minimized and/or maximized. A function may be defined by reference to selection criteria constraints and/or weighted aggregation thereof as provided by randomization engine 112; for instance, a selection process combining optimization criteria may seek to minimize or maximize a function of region selection.

Still referring to FIG. 1, randomization device 112 may use an objective function to compare multiple regions of digital media file 108. Generation of an objective function may include generation of a function to score and weight factors to achieve a process score for each feasible pairing. In some embodiments, pairings may be scored in a matrix for optimization, where columns represent regions and rows represent selections potentially paired therewith; each cell of such a matrix may represent a score of a pairing of the corresponding region to the corresponding selection. In some embodiments, assigning a predicted process that optimizes the objective function includes performing a greedy algorithm process. A "greedy algorithm" is defined as an algorithm that selects locally optimal choices, which may or may not generate a globally optimal solution. For instance, randomization engine 112 may select pairings so that scores associated therewith are the best score for each order and/or for each process. In such an example, optimization may determine the combination of processes such that each region selection includes the highest score possible.

Still referring to FIG. 1, an objective function may be formulated as a linear objective function. Randomization engine 112 may solve an objective function using a linear program such as, without limitation, a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all regions r, S is a set of all selections s, $c_{rs}$ is a score of a pairing of a given region with a given selection, and $x_{rs}$ is 1 if a region r is paired with a selection s, and 0 otherwise. Continuing the example, constraints may specify that each region is assigned to only one selection, and each selection is assigned only one region. Selections may include selection processes as described above. Sets of processes may be optimized for a maximum score combination of all generated processes. In various embodiments, randomization engine 112 may determine a combination of regions that maximizes a total score subject to a constraint that all regions are paired to exactly one selection. Not all selections may receive a region pairing since each selection may only produce one region. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on computing device 104 and/or another device in system 100, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, include absolute value, numerical size, or the like. Selection of different loss functions may result in identification of different potential pairings as generating minimal outputs. Objectives represented in an objective function and/or loss function may include minimization of pixel chroma values. Objectives may include minimization of region areas. Objectives may include minimization of pixel luma values.

Still referring to FIG. 1, in a non-limiting example, selected portion 116 may include a top left area of a video frame of digital media file 108. In some embodiments, randomization engine 112 may randomly select one or more frames of digital media file 108. In a non-limiting example, digital media file may include three frames. Randomization engine 112 may select frames 1 and 3 but not frame 2. In some embodiments, selected portion 116 may include quanta data. "Quanta data" as used in this disclosure is information pertaining to a digital file. In some embodiments, quanta data may include content bits. "Content bits" as used in this disclosure are bits of a media file. In some embodiments, content bits may include frame data. "Frame data" as used in this disclosure is information pertaining to a portion of a file for a specific moment in time. Frame data may include, but is not limited to, pixels, audio values, and the like. In some embodiments, randomization engine 112 may randomly select quanta data of digital media file 108 to generated selected portion 116. As a non-limiting example, randomization engine 112 may randomly select a group of four pixels of a video frame of digital media file 108. In other embodiments, randomization engine 112 may select quanta data within a set of selection criteria. "Selection criteria" as used in this disclosure is one or more parameters constraining a selection. Selection criteria may include, but is not limited to, pixel density, clarity, opaqueness, brightness, white balance, motion blur, and the like. As a non-limiting example, digital media file 108 may include a video of a man hitting a baseball. Selection criteria of randomization engine 112 may constrain randomization engine 112 to randomly select quanta data with a high motion blur and a low clarity. Randomization engine 112 may select a group of pixels around a bat, baseball, player, pitcher, catcher, and the like based on the constraints of a high motion blur and a low clarity. In some embodiments, randomization engine 112 may generate a different selected portion 116 for each frame of digital media file 108.

Still referring to FIG. 1, computing device 104 may include injection module 120. An "Injection module" as used in this disclosure is a process capable of inserting data into a data file. In some embodiments, injection module 120 may be configured to inject identifying data into selected portion 116. "Identifying data" as used in this disclosure is a set of unique values. In some embodiments, identifying data may be represented by one or more bits. In some embodiments, identifying data may include a binary sequence of information. In some embodiments, identifying data may include, but is not limited to, locational data, temporal data, access data, and the like. In some embodiments, locational data of identifying data may be generated by a GPS device. Identifying data may include data about an end user, creator, location of a file upload, period of use, authorized use, and the like. Authorized use may include data of a legitimacy of access to one or more digital media files. As a non-limiting example, a user may rent a video to stream and hack the streaming service, record the video with a camera, etc. Authorized data may indicate if the user was authorized to access the video or if the user illicitly accessed the video. In some embodiments, identifying data may be generated by injection module 120. In other embodiments, identifying data may be retrieved by data from digital media file 108. In other embodiments, identifying data may be received from a user. Identifying data may be represented pictorially. In some embodiments, identifying data may include encrypted data. In some embodiments, identifying data may include a digital signature. In some embodiments, identifying data may be stored in an immutable sequence listing, such as a blockchain. In some embodiments, identifying data may include a symbol and/or a group of symbols, such as a watermark. Injection module 120 may be configured to inject differing forms of identifying data into different selected portions 116. As a non-limiting example, injection module 116 may insert a watermark into a first selected portion. The watermark may have a size of 2 cm by 4 cm. Injection module 120 may insert a watermark into a second selected portion. The watermark inserted into the second selected portion may have a size of 3 cm by 1.5 cm. Injection module 120 may insert identifying data into each selected portion in different sizes, resolutions, distortions, and the like.

Still referring to FIG. 1, in some embodiments injection module 120 may be configured to encode identifying data of selected portion 116. Injection module 120 may include an encoding process such as, but not limited to, Least Significant Bit (LSB), discrete cosine transform (DCT), and the like. Injection module 120 may use an encoding process to modify one or more quantum of a plurality of quanta of frame data of selected portion 116. Injection module 120 may modify pixel values of selected portion 116 to represent identifying data. As a non-limiting example, injection module 120 may identify one or more pixels of selected portion 116. The pixels of selected portion 116 may each have 24 bits (24 bpp). Injection module 120 may adjust 1-3 bits of one or more of the 24 bpp pixels. By adjusting a few bits of one or more 24 bpp pixels, identifying data may be injected into selected portion 116 without perceptible changes. As another non-limiting example, selected portion 116 may have a plurality of 8-bit pixels (8 bpp), with each pixel representing red, green, and blue values. A first pixel may have an 8-bit binary digit value of 00101101 for red, 00011100 for green, and 11011100 for blue. A second pixel may have an 8-bit binary digit value of 10100110 for red, 11000100 for green, and 00001100 for blue. A third pixel may have an 8-bit binary digit value of 11010010 for red, 10101101 for green, and 01100011 for blue. Injection module 120 may inject identifying data in a form of the number 200. Injection module 120 may convert the number 200 to its binary value, 11001000, and use each digit of that value to replace a least significant digit of each pixel's value. Continuing this example, the new values of the first pixel would be 00101101 for red, 00011101 for green, and 11011100 for blue. The new values of the second pixel would be 10100110 for red, 11000101 for green, and 00001100 for blue. The new values for the third pixel would be 11010010 for red, 10101100 for green, and 01100011 for blue. The last digit of each of the new values for the first through third pixels would recite 11001000, the binary value for the number 200. In some embodiments, injection module 120 may modify pixel values of selected portion 116 to represent identifying data such as, but not limited to, a watermark. In some embodiments, injection module 120 may modify pixel values of selected portion 116 to visibly show identifying data in a video frame of selected portion 116. In other embodiments, injection module 120 may modify pixel values of selected portion 116 to hide identifying data from optical perception.

Still referring to FIG. 1, in some embodiments, computing device 104 may be configured to output modified digital file 124. Modified digital file 124 may include a digital media file that may include identifying data. Modified digital file 124 may be part of a bitstream generated by computing device 104. A "bitstream" as used in this disclosure is a flow of information. In some embodiments, a bitstream may include a digital bitstream. Computing device 104 may generate a plurality of modified digital files 124 to construct a bitstream. In some embodiments, computing device 104 may modify encoded display quanta. In some embodiments, computing device 104 may dynamically generate modified digital files 124 to match a bitstream rate of digital media files 108. In a non-limiting example, computing device 104 may receive a plurality of digital media files 108 in a bit rate of, but not limited to, 128 kbits/s. Computing device 104 may increase or decrease an amount of identifying data injected into selected portions 116 to maintain a bit rate of 128 kbits/s. In some embodiments, computing device 104 may change an amount of identifying data based on resolution. Identifying data may be increased or decreased based on a higher and/or lower quality of resolution of digital media file 108. As a non-limiting example, digital media file 108 may include a 4k video frame. Injection module 120 may inject less identifying data to manage a bit rate. In some embodiments, injection module 120 may inject more data into the 4k video frame due to the higher availability of pixel bits. In some embodiments, injection module 120 may encode identifying data into selected portion 116 while maintaining an original bit rate of digital media file 108. Injection module 120 may modify one or more bits of one or more display quanta of selected portion 116, which may leave a bit rate of digital media file 108 unchanged. In some embodiments, modified digital file 124 may be provided to user 128. A plurality of modified digital files 124 may be provided to user 128 in a sequential order to construct a video. In some embodiments, computing device 104 may encode display quanta of digital media file 108 using error correction codes. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code. In some embodiments, modified digital file 124 may include an immutable sequence listing. Modified digital file 124 may include an immutable sequence listing that may prevent data alterations after data creation. An immutable sequence listing may be described below with reference to FIG. 5.

Figure 2:
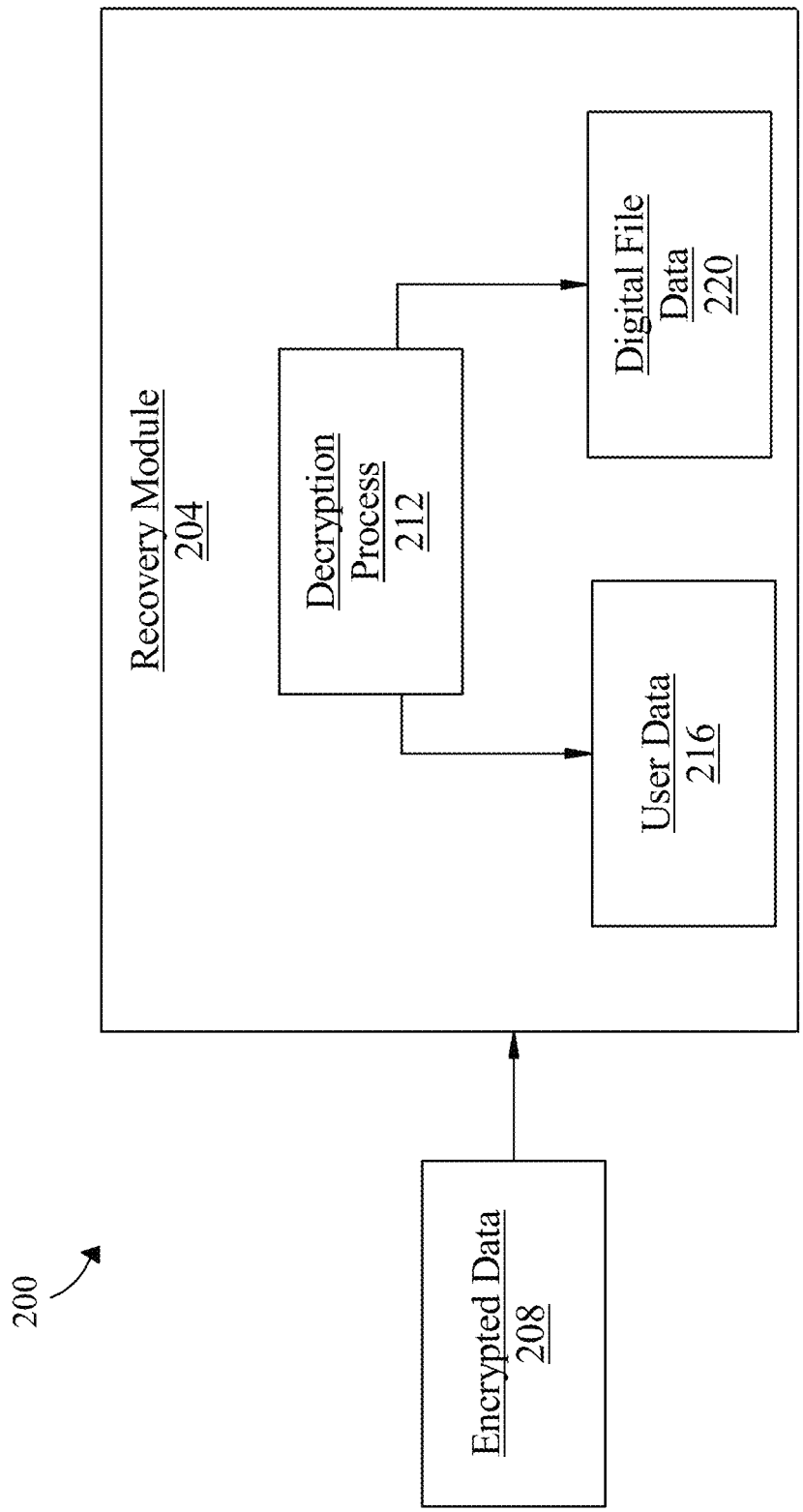
FIG. 2 is an exemplary embodiment of a recovery module.

Now referring to FIG. 2, a system for data recovery 200 is shown. System 200 may include recovery module 204. A "recovery module" as used in this disclosure is a process that extracts and stores data. Recovery module 204 may be located in computing device 104. In other embodiments, recovery module 204 may be located in a remote computing device. Recovery module 204 may be configured to receive encrypted data 208. Encrypted data 208 may include modified digital file 124. In some embodiments, recovery module 204 may include decryption process 212. Decryption process 212 may be configured to decipher modified frame data produced by injection module 120. In some embodiments, decryption process 212 may extrapolate identifying data of encrypted data 208. Decryption process 212 may generate data from encrypted data 208. In some embodiments, decryption process 212 may generate user data 216. User data 216 may include a location. A location may include geographical coordinates, zip code, town name, state name, country, and the like. User data 216 may include a user type. A user type may include a household member, computer streamer, and the like. User data 216 may include a name and address of a user. User data 216 may include a user access device. A user access device may include, but is not limited to, a smartphone, laptop, smart tv, desktop, tablet, video game console, and the like. In some embodiments, user data 216 may include IP addresses of computing devices. In some embodiments user data 216 may include user data of a plurality of users.

Still referring to FIG. 2, in some embodiments, decryption process 212 may produce digital file data 220. Digital file data 220 may include a content type. A content type may include, but is not limited to, a short film, a full film, a video game, a video game stream, a tv show, medical readings, industrial analytics, security footage, and the like. In some embodiments, digital file data 220 may include a unique identifier that may correspond to a specific media source. As a non-limiting example, digital file data 220 may include unique identifier 211 HJK which may correspond to a specific reality tv show. In some embodiments, digital file data 220 may include an access type such as, but not limited to, web streaming, theatrical release, DVD and/or CD access, and the like. In some embodiments, digital file data 220 may include a temporal element. A temporal element may include, but is not limited to, a time of access, a duration of access, an end time, and the like. As a non-limiting example, digital file data 220 may show a horror movie was accessed on Oct. 7, 2021 at 4:15 P.M. on a web-streaming service for a duration of 1 hour and 46 minutes.

Figure 3:
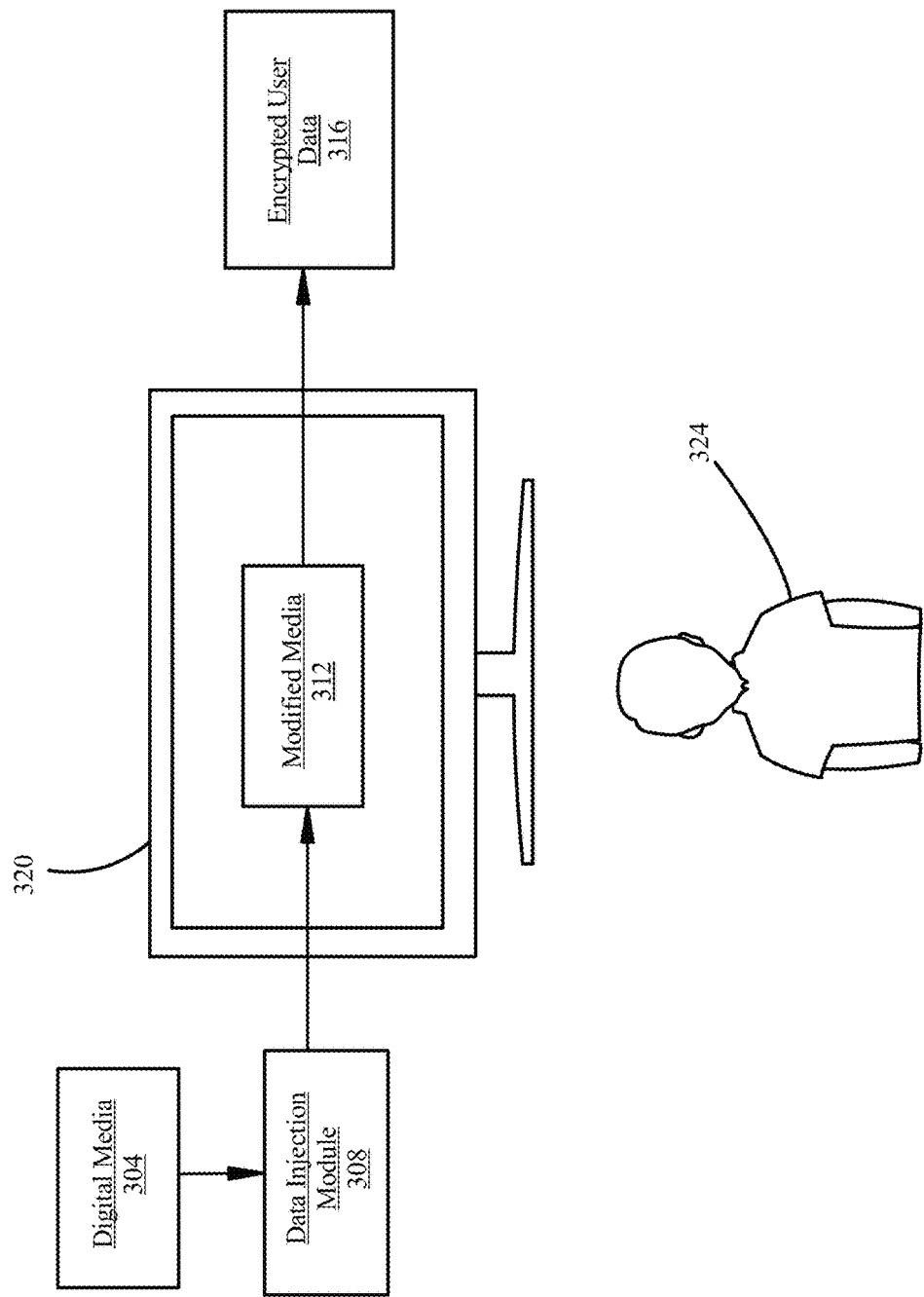
FIG. 3 is an exemplary embodiment of digital media delivery.

Now referring to FIG. 3, an illustration of a system 300 for data injection is presented. System 300 may include digital media 304. Digital media 304 may include, but is not limited to, tv shows, movies, short films, videos, podcasts, documentaries, medical data, industrial data, security data, and the like. Medical data may include, but is not limited to, medical readings, medical records, and the like. Industrial data may include, but is not limited to, processing data, inventory data, manufacturing data, and the like. Security data may include, but is not limited to, security footage, digital identification systems, and the like. Digital media 304 may be received from an external computing device, such as a server. Data injection module 308 may intercept one or more streams of quanta of digital media 304. Streams of quanta of digital media 304 may include video frames, audio frames, and the like. In some embodiments, data injection module 308 may inject identifying data into one or more frames of digital media 304. In some embodiments, data injection module 308 may generate a stream of quanta to media access device 320. Data injection module 308 may maintain an original bit rate of digital media 304. In some embodiments, data injection module 308 may dynamically adjust an amount of data injected into digital media 304 to prevent visible latency between modified media 312 and digital media 304. In some embodiments, modified media 312 may have near-zero latency. Media access device 320 may include, but is not limited to, a tv, laptop, desktop, smartphone, tablet, and the like. In some embodiments, a stream of quanta may include modified media 312. Modified media 312 may include identifying data injected by data injection module 308. In some embodiments, modified media 312 may be provided to user 324. User 324 may include, but is not limited to, an individual, group of individuals, and the like. In some embodiments, user 324 may record modified media 312 with a computing device. Recorded modified media may generate encrypted user data 316. Encrypted user data 316 may include identifying data that may convey a time of access, a user identity, a user location, a media access device type, a media access device IP address, and the like. In some embodiments, there may be a second user that may separately record modified media 312 provided by media access device 320. A second user may have separate encrypted user data 316 that may identify the second user's location, identity, access type, and the like.

Now referring to FIG. 4A, first digital media frame 404A is presented. First digital media frame 404A may include a video frame of a movie, tv show, and the like. In some embodiments, first digital media frame 404A may include a horror movie scene of a zombie walking at night by a tree. First digital media frame 404A may include pixels 408A. Pixels 408A may include color values representing an image of first digital media frame 404A. In some embodiments, a randomization engine may select one or more pixels 408A as a function of an injection criteria. An injection criteria may include, but is not limited to, pixel density, clarity, white balance, contrast, sharpness, opaqueness, motion blur, and the like. As a non-limiting example, a randomization engine may select a tree of a background of a video frame due to the lower clarity, darker colors, and the like. An injection module may inject identifying data 412A into the tree by modifying pixel values representing the tree.

Now referring to FIG. 4B, second digital media frame 404B is presented. Second digital media frame 404B may include a video frame sequential to first digital media frame 404A. In some embodiments, second digital media frame 404B may include pixels 404B. Pixels 404B may include values corresponding to an image of second digital media frame 404B. In some embodiments, a randomization engine may select a portion of second digital media frame 404B to inject identifying data into. In some embodiments, a randomization engine may include an injection criteria such as, but not limited to, clarity, motion blur, opaqueness, white balance, brightness, and the like. As a non-limiting example a randomization engine may select the moon of second digital media frame 404B. The moon may be selected due to its position in the background, brightness, white balance, and the like. An injection module may inject identifying data 412B into the moon of second digital media frame 404B. Identifying data 412B may include a different resolution, distortion, dimensions, and the like than identifying data 412A. In some embodiments, a randomization engine may select an injection site of a media file on a frame-by-frame basis. In some embodiments, identifying data may move locations between sequential frames.

Figure 5:
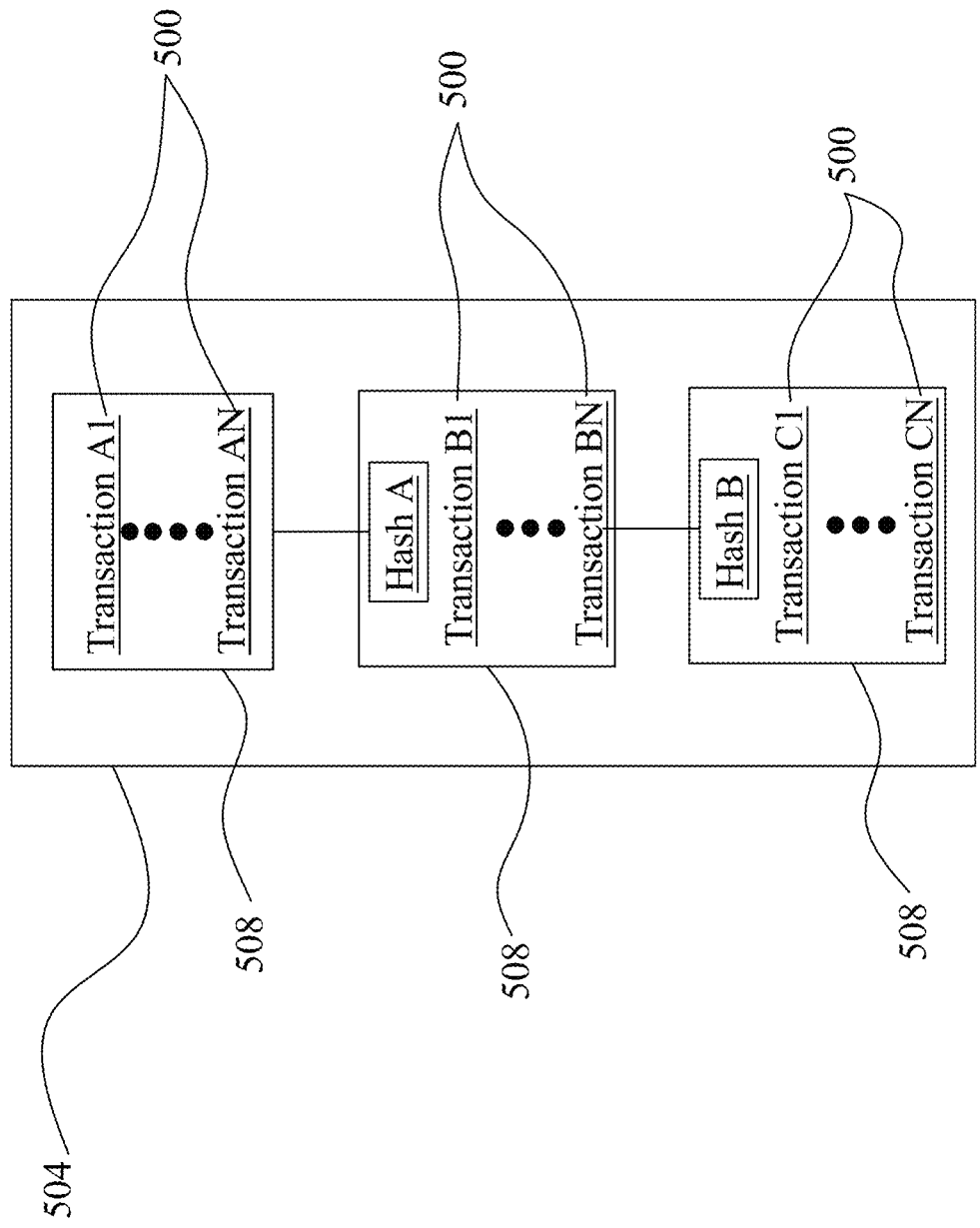
FIG. 5 is a block diagram of an exemplary embodiment of an immutable sequence listing.

Referring now to FIG. 5, an exemplary embodiment of an immutable sequential listing 500 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listed in immutable sequential listing 500; data elements may include any form of data, including textual data, image data, encrypted data, cryptographically hashed data, and the like. Data elements may include, without limitation, one or more at least a digitally signed assertions. In one embodiment, a digitally signed assertion 504 is a collection of textual data signed using a secure proof as described in further detail below; secure proof may include, without limitation, a digital signature as described above. Collection of textual data may contain any textual data, including, without limitation, American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 504 register is transferring that item to the owner of an address. A digitally signed assertion 504 may be signed by a digital signature created using the private key associated with the owner's public key, as described above.

Still referring to FIG. 5, a digitally signed assertion 504 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 504 may describe the transfer of a physical good; for instance, a digitally signed assertion 504 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 504 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 504. In some embodiments, address is linked to a public key, the corresponding private key of which is owned by the recipient of a digitally signed assertion 504. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 504 may record a subsequent digitally signed assertion 504 transferring some or all of the value transferred in the first digitally signed assertion 504 to a new address in the same manner. A digitally signed assertion 504 may contain textual information that is not a transfer of some item of value in addition to, or as an alternative to, such a transfer. For instance, as described in further detail below, a digitally signed assertion 504 may indicate a confidence level associated with a distributed storage node as described in further detail below.

In an embodiment, and still referring to FIG. 5, immutable sequential listing 500 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 500 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 500 may preserve the order in which the at least a posted content took place by listing them in chronological order; alternatively or additionally, immutable sequential listing 500 may organize digitally signed assertions 504 into sub-listings 508 such as "blocks" in a blockchain, which may be themselves collected in a temporally sequential order; digitally signed assertions 504 within a sub-listing 508 may or may not be temporally sequential. The ledger may preserve the order in which at least a posted content took place by listing them in sub-listings 508 and placing the sub-listings 508 in chronological order. The immutable sequential listing 500 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 500 may be incorporated in, stored in, or incorporate, any suitable data structure, including, without limitation, any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 5, immutable sequential listing 500, once formed, may be inalterable by any party, no matter what access rights that party possesses. For instance, immutable sequential listing 500 may include a hash chain, in which data is added during a successive hashing process to ensure non-repudiation. Immutable sequential listing 500 may include a block chain. In one embodiment, a block chain is immutable sequential listing 500 that records one or more new at least a posted content in a data item known as a sub-listing 508 or "block." An example of a block chain is the BITCOIN block chain used to record BITCOIN transactions and values. Sub-listings 508 may be created in a way that places the sub-listings 508 in chronological order and link each sub-listing 508 to a previous sub-listing 508 in the chronological order so that any computing device may traverse the sub-listings 508 in reverse chronological order to verify any at least a posted content listed in the block chain. Each new sub-listing 508 may be required to contain a cryptographic hash describing the previous sub-listing 508. In some embodiments, the block chain contains a single first sub-listing 508 sometimes known as a "genesis block."

Still referring to FIG. 5, the creation of a new sub-listing 508 may be computationally expensive; for instance, the creation of a new sub-listing 508 may be designed by a "proof of work" protocol accepted by all participants in forming the immutable sequential listing 500 to take a powerful set of computing devices a certain period of time to produce. Where one sub-listing 508 takes less time for a given set of computing devices to produce the sub-listing 508 protocol may adjust the algorithm to produce the next sub-listing 508 so that it will require more steps; where one sub-listing 508 takes more time for a given set of computing devices to produce the sub-listing 508 protocol may adjust the algorithm to produce the next sub-listing 508 so that it will require fewer steps. As an example, protocol may require a new sub-listing 508 to contain a cryptographic hash describing its contents; the cryptographic hash may be required to satisfy a mathematical condition, achieved by having the sub-listing 508 contain a number, called a nonce, whose value is determined after the fact by the discovery of the hash that satisfies the mathematical condition. Continuing the example, the protocol may be able to adjust the mathematical condition so that the discovery of the hash describing a sub-listing 508 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 508 according to the protocol is known as "mining." The creation of a new sub-listing 508 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 508. The incentive may be financial; for instance, successfully mining a new sub-listing 508 may result in the person or entity that mines the sub-listing 508 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 508 Each sub-listing 508 created in immutable sequential listing 500 may contain a record or at least a posted content describing one or more addresses that receive an incentive, such as virtual currency, as the result of successfully mining the sub-listing 508.

With continued reference to FIG. 5, where two entities simultaneously create new sub-listings 508, immutable sequential listing 500 may develop a fork; protocol may determine which of the two alternate branches in the fork is the valid new portion of the immutable sequential listing 500 by evaluating, after a certain amount of time has passed, which branch is longer. "Length" may be measured according to the number of sub-listings 508 in the branch. Length may be measured according to the total computational cost of producing the branch. Protocol may treat only at least a posted content containing the valid branch as valid at least a posted content. When a branch is found invalid according to this protocol, at least a posted content registered in that branch may be recreated in a new sub-listing 508 in the valid branch; the protocol may reject "double spending" at least a posted content that transfers the same virtual currency that another at least a posted content in the valid branch has already transferred. As a result, in some embodiments the creation of fraudulent at least a posted content requires the creation of a longer immutable sequential listing 500 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 500.

Still referring to FIG. 5, additional data linked to at least a posted content may be incorporated in sub-listings 508 in the immutable sequential listing 500; for instance, data may be incorporated in one or more fields recognized by block chain protocols that permit a person or computer forming an at least a posted content to insert additional data in the immutable sequential listing 500. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 5, in some embodiments, virtual currency is traded as a crypto-currency. In one embodiment, a crypto-currency is a digital currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 508 in a block chain computationally challenging; the incentive for producing sub-listings 508 may include the grant of new crypto-currency to the miners. Quantities of crypto-currency may be exchanged using at least a posted content as described above.

In an embodiment, and still referring to FIG. 5, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key. In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, and still referring to FIG. 5, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and still referring to FIG. 5, a hashing algorithm may demonstrate an "avalanche effect", whereby even extremely small changes to a lot of data produce drastically different hashes. This may thwart attempts to avoid the computational work necessary to recreate a hash by simply inserting a fraudulent datum in a data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may be on the order of $O(2^{n/2})$ for n output bits; thus, it may take on the order of $2^{256}$ operations to locate a collision in a 512 bit output. "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 5, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 5, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 5, alternatively, zero-knowledge proof may include a non-interactive zero-knowledge proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 5, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 5, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies on prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including, without limitation, encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of a file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 5, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 5, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 6:
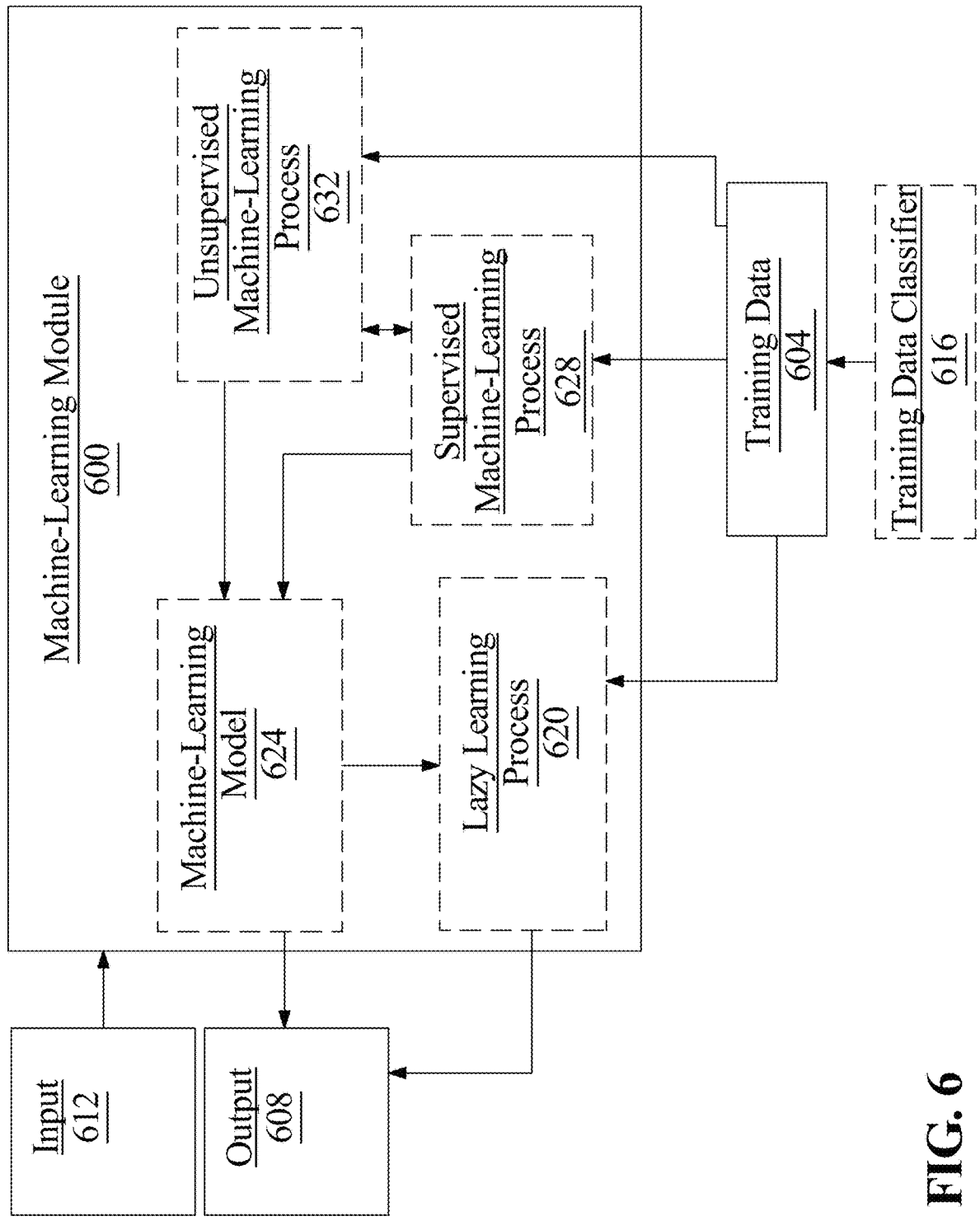
FIG. 6 is a block diagram of an exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include frame data and outputs may include selected portions of a digital media file.

Further referring to FIG. 6, training data may be filtered, sorted, and/or selected using one or more supervised and/or unsupervised machine-learning processes and/or models as described in further detail below; such models may include, without limitation, a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as, without limitation, logistic regression and/or Naïve Bayes classifiers, nearest neighbor classifiers such as K-nearest neighbors classifiers, support vector machines, least squares support vector machines, Fisher's linear discriminant, quadratic classifiers, decision trees, boosted trees, random forest classifiers, learning vector quantization, and/or neural network-based classifiers. As a non-limiting example, training data classifier 616 may classify elements of training data to pixel density, pixel brightness, white balance, motion blur, opaqueness, transparency, contrast, sharpness, and the like.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation, a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation, lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process, including without limitation, any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, includes algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include frame data as described above as inputs, selected portions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning process 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes. In some embodiments, a machine-learning algorithm may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data. Classification may be performed using, without limitation, linear classifiers such as, without limitation, logistic regression and/or Naïve Bayes classifiers, nearest neighbor classifiers such as K nearest neighbors classifiers, support vector machines, least squares support vector machines, Fisher's linear discriminant, quadratic classifiers, decision trees, boosted trees, random forest classifiers, learning vector quantization, and/or neural network-based classifiers.

Still referring to FIG. 6, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a Gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating K nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^n a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 7:
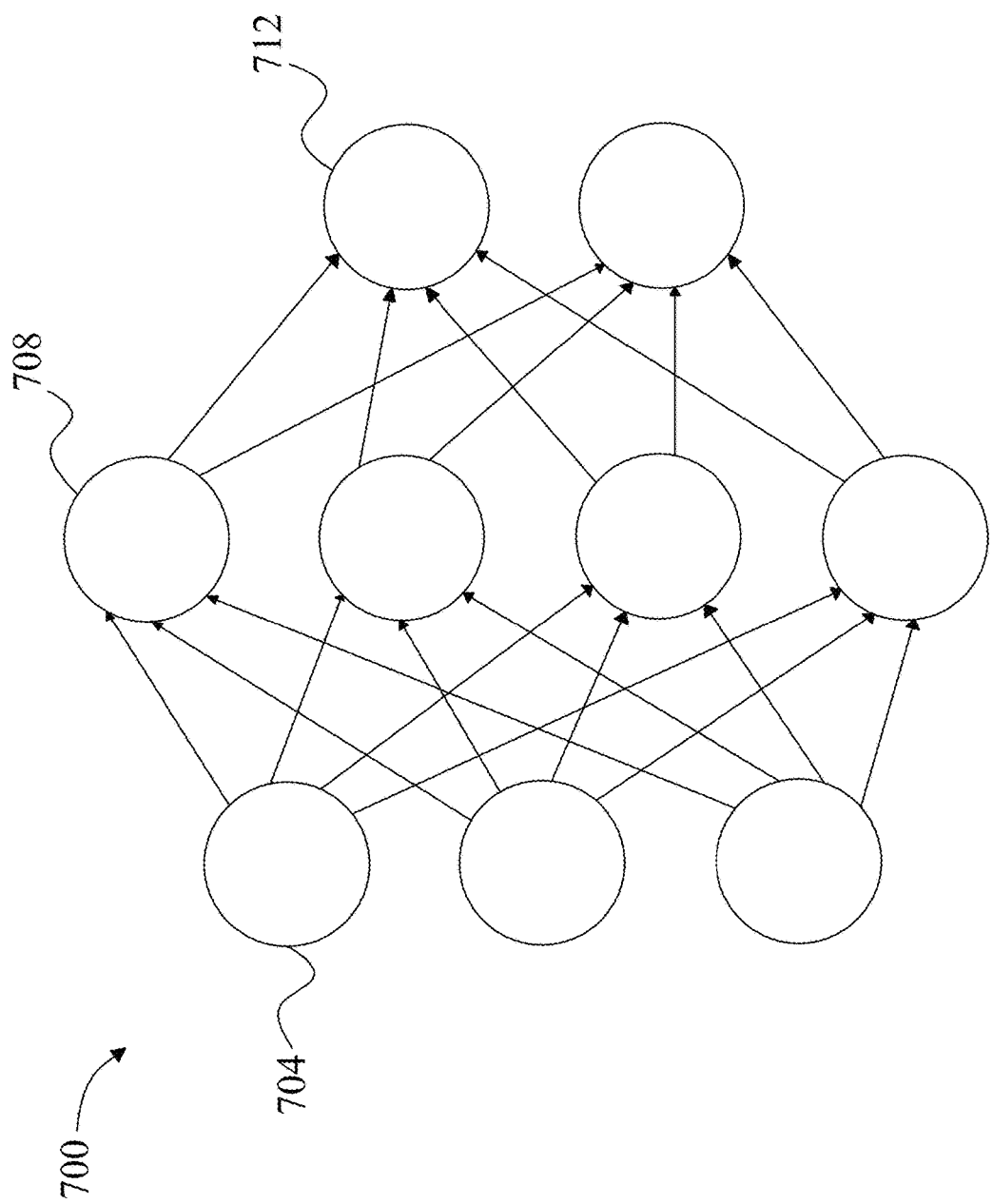
FIG. 7 is an illustration of an exemplary embodiment of a neural net.

Referring now to FIG. 7 an exemplary embodiment of neural network 700 is illustrated. A neural network 700, also known as an artificial neural network, is a network of "nodes," or data structures having one or more inputs, one or more outputs, and a function determining outputs based on inputs. Such nodes may be organized in a network, such as, without limitation, a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 8:
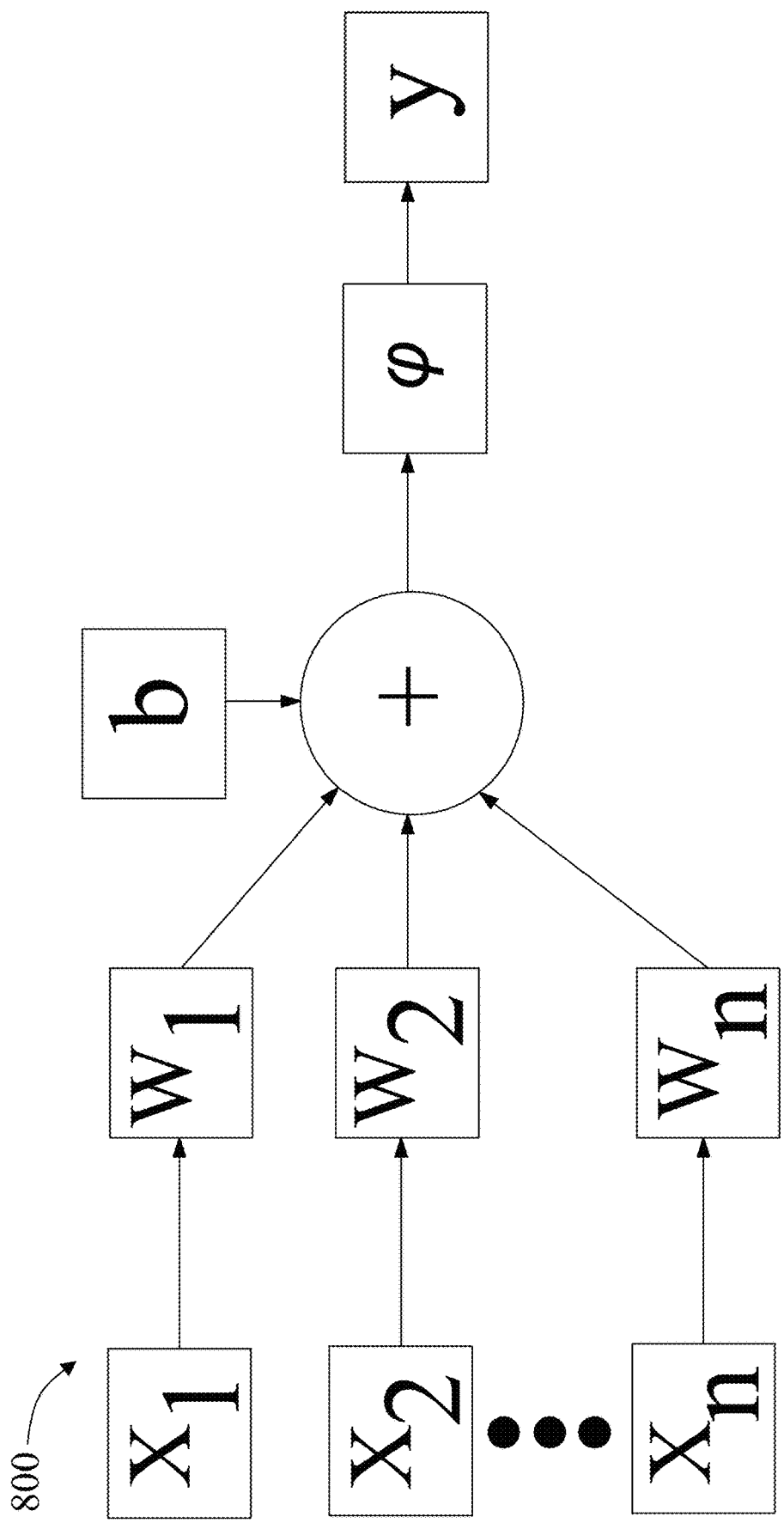
FIG. 8 is another illustration of an exemplary embodiment of a neural net.

Referring now to FIG. 8, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
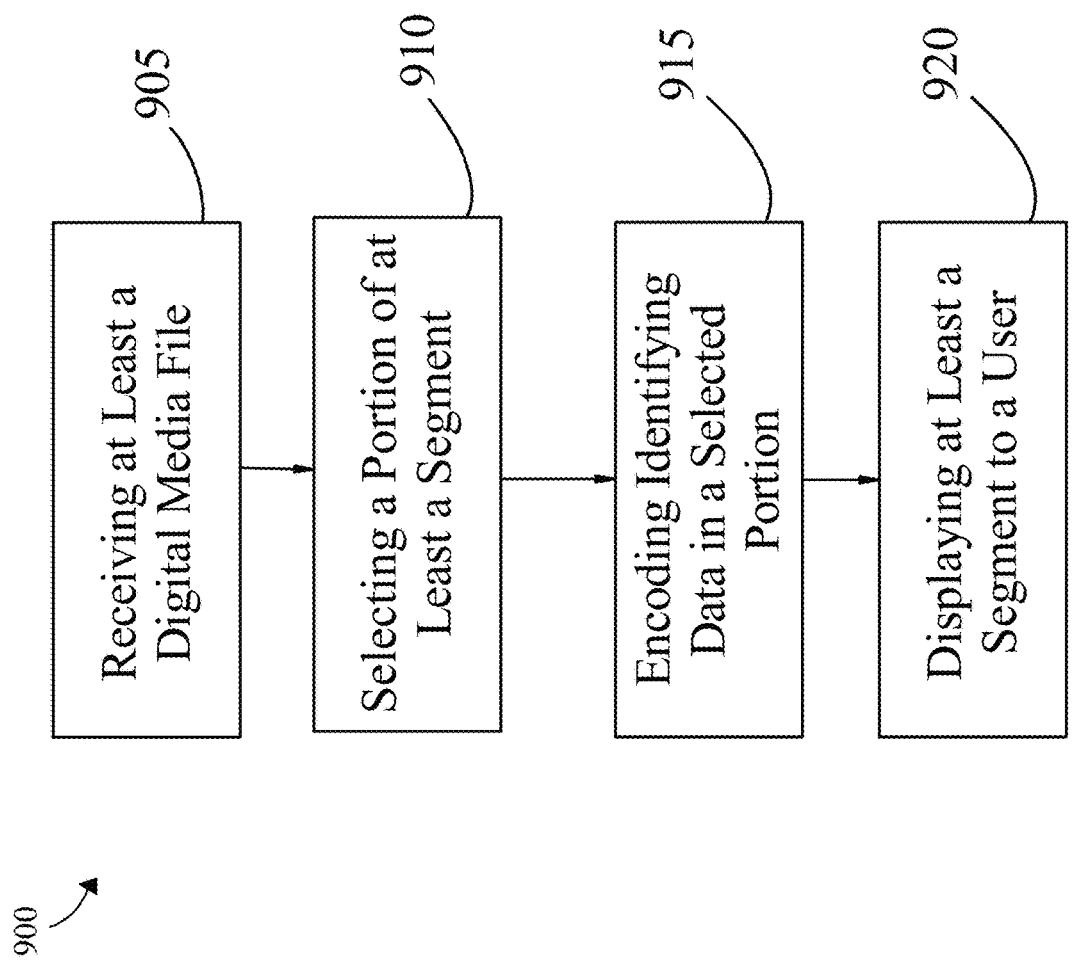
FIG. 9 is a flowchart of a method of dynamic data injection.

Now referring to FIG. 9, method 900 of dynamic data injection is presented. At step 905, method 900 includes receiving at least a digital media file. A digital media file may include, but is not limited to, a video frame, audio sample, and the like. At least a digital media file may be received from a media source such as, but not limited to, a web stream. This step may be implemented as described above in FIGS. 1-4.

Still referring to FIG. 9, at step 910, method 900 includes selecting a portion of at least a segment. A portion of at least a segment may include a portion of at least a frame of a digital media file. A frame may include, but is not limited to, a video frame, audio frame, and the like. In some embodiments, selecting a portion of at least a frame may include selecting a portion of at least a frame as a function of a randomization engine. This step may be implemented as described above in FIGS. 1-4.

Still referring to FIG. 9, at step 915, method 900 includes encoding identifying data in a selected portion. Encoding may include modifying a quanta of a plurality of quanta of at least a segment of at least a digital media file. This step may be implemented as described above in FIGS. 1-4.

Still referring to FIG. 9, at step 920, method 900 includes displaying at least a segment to a user. Displaying at least a segment to a user may include displaying a modified digital media file to a user. This step may be implemented as described above in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
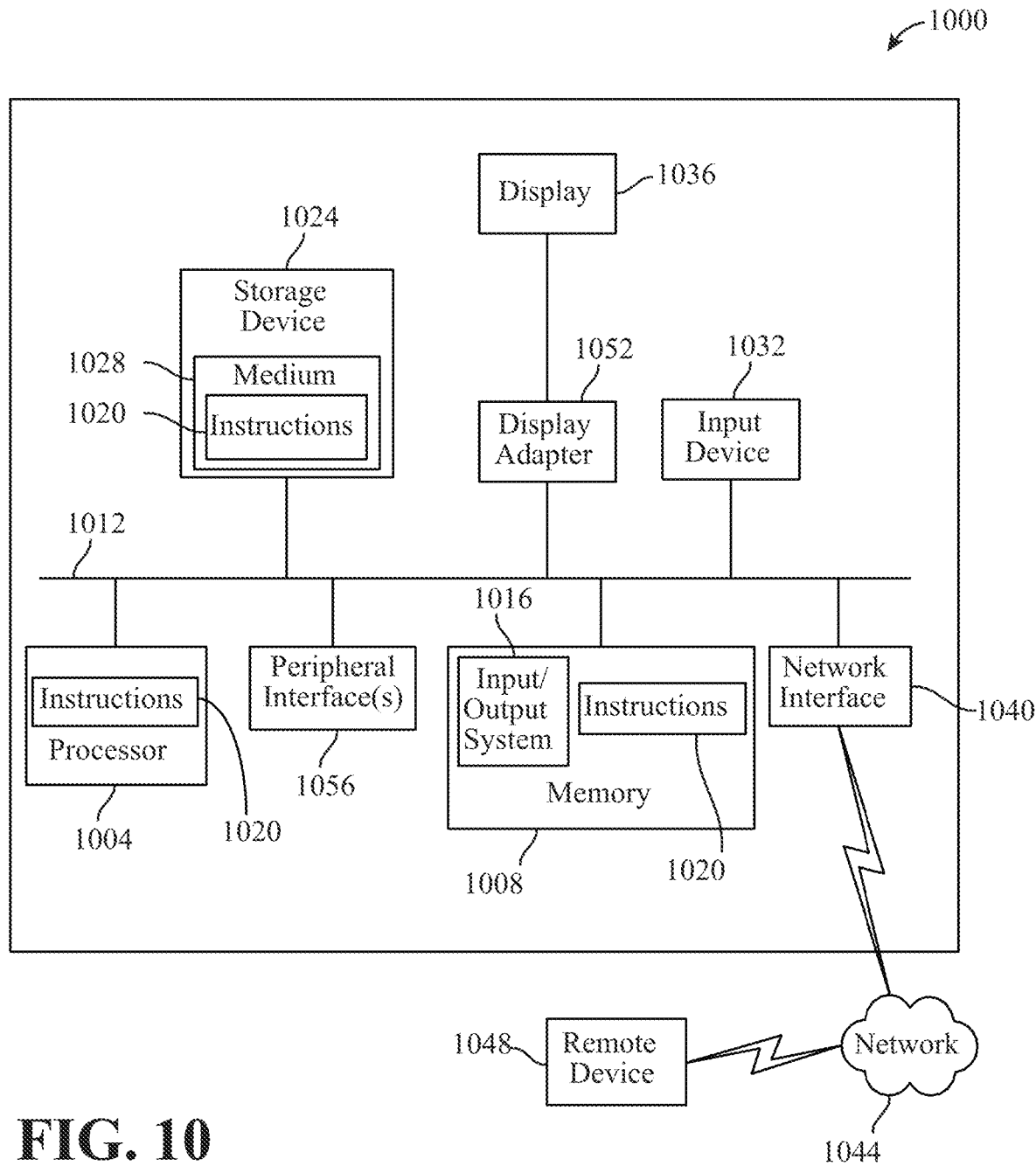
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Still referring to FIG. 10, processor 1004 may include any suitable processor, such as, without limitation, a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 10, memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Still referring to FIG. 10, computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Still referring to FIG. 10, computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

Still referring to FIG. 10, a user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Still referring to FIG. 10, computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A system for dynamic data injection, comprising:
a computing device configured to:
receive at least a digital media file, wherein the at least a digital media file comprises at least a segment comprising a plurality of display quanta;
select a portion of the at least a segment of the at least a digital media file as a function of a randomization engine, wherein the randomization engine includes a frame classifier, wherein selecting the portion of the at least a segment further comprises:
training the frame classifier using training data and a machine learning algorithm, wherein the training data comprises frame data correlated with frame categorization data;
classifying, using the trained frame classifier, parts of the at least a segment into a plurality of categories, wherein the at least a segment is provided to the trained classifier as an input to output the plurality of categories; and
selecting, randomly, the portion of the at least a segment from one category of the plurality of categories;
encode identifying data in the selected portion, wherein encoding further comprises modifying at least a display quanta of the plurality of display quanta of the selected portion of the at least a segment; and
display the at least a segment to a user.

2. The system of claim 1, wherein the computing device is further configured to encode the at least a segment in a bitstream, and wherein each quantum of the plurality of quanta is a pixel.

3. The system of claim 1, wherein the computing device is further configured to generate an immutable sequence listing of user data as a function of the at least a segment displayed to the user.

4. The system of claim 1, wherein the computing device is further configured to communicate with a recovery module, wherein the recovery module is configured to extract encoded data from the at least a segment.

5. The system of claim 1, wherein the computing device is further configured to:
select a second portion of a second segment of the at least a digital media file as a function of the randomization engine, wherein the second portion of a second segment is different from the selected portion of the at least a segment; and
encode a second set of identifying data in the second portion of the second segment, wherein the second set of identifying data is different from the identifying data of the selected portion of the at least a segment of the at least a digital media file.

6. The system of claim 1, wherein the computing device is further configured to identify a plurality of users.

7. The system of claim 6, wherein the computing device is further configured to generate unique data for each user of the plurality of users.

8. The system of claim 1, wherein the computing device is further configured to receive the at least a digital media file from a streaming server.

9. The system of claim 1, wherein modification of the at least a quanta of the plurality of quanta is imperceptible to the user.

10. A method of dynamic data injection using a computing device, comprising:
receiving at least a digital media file, wherein the at least a digital media file comprises at least a segment comprising a plurality of display quanta;
selecting a portion of the at least a segment of the at least a digital media file as a function of a randomization engine, wherein the randomization engine includes a frame classifier, wherein selecting the portion of the at least a segment further comprises:
training the frame classifier using training data and a machine learning algorithm, wherein the training data comprises frame data correlated with frame categorization data;
classifying, using the trained frame classifier, parts of the at least a segment into a plurality of categories, wherein the at least a segment is provided to the trained classifier as an input to output the plurality of categories; and
selecting, randomly, the portion of the at least a segment from one category of the plurality of categories;
encoding identifying data in the selected portion, wherein encoding further comprises modifying at least a display quanta of the plurality of display quanta of the selected portion of the at least a segment; and
displaying the at least a segment to a user.

11. The method of claim 10, wherein encoding comprises encoding the at least a segment in a bitstream, and wherein each quantum of the plurality of quanta is a pixel.

12. The method of claim 10, wherein the computing device is further configured to generate an immutable sequence listing of user data as a function of the at least a segment displayed to the user.

13. The method of claim 10, wherein the computing device is further configured to communicate with a recovery module, wherein the recovery module is configured to extract encoded data from the at least a segment.

14. The method of claim 10, wherein the computing device is further configured to:
select a second portion of a second segment of the at least a digital media file as a function of the randomization engine, wherein the second portion of a second segment is different from the selected portion of the at least a segment; and
encode a second set of identifying data in the second portion of the second segment, wherein the second set of identifying data is different from the identifying data of the selected portion of the at least a segment of the at least a digital media file.

15. The system of claim 14, wherein selecting the second portion of the second segment of the at least a digital media file further comprises using a fuzzy matching process to select the second portion of the second segment, wherein using the fuzzy matching process comprises:
executing a fuzzy set comparison between a plurality of portions of the second segment;
ranking each portion of the plurality of portions as a function of the fuzzy set comparison; and
randomly selecting the second portion from the plurality of portions as a function of the ranking of each portion of the second segment.

16. The method of claim 14, wherein selecting the second portion of the second segment of the at least a digital media file further comprises using a fuzzy matching process to select the second portion of the second segment, wherein using the fuzzy matching process comprises:
executing a fuzzy set comparison between a plurality of portions of the second segment;
ranking each portion of the plurality of portions as a function of the fuzzy set comparison; and
randomly selecting the second portion from the plurality of portions as a function of the ranking of each portion of the second segment.

17. The method of claim 10, wherein the computing device is further configured to identify a plurality of users.

18. The method of claim 17, wherein the computing device is further configured to generate unique data for each user of the plurality of users.

19. The method of claim 10, wherein receiving at least a digital media file further comprises receiving the at least a digital media file from a streaming server.

20. The method of claim 10, wherein modification of the at least a quanta of the plurality of quanta is imperceptible to the user.

* * * * *